Patented Dec. 2, 1924.

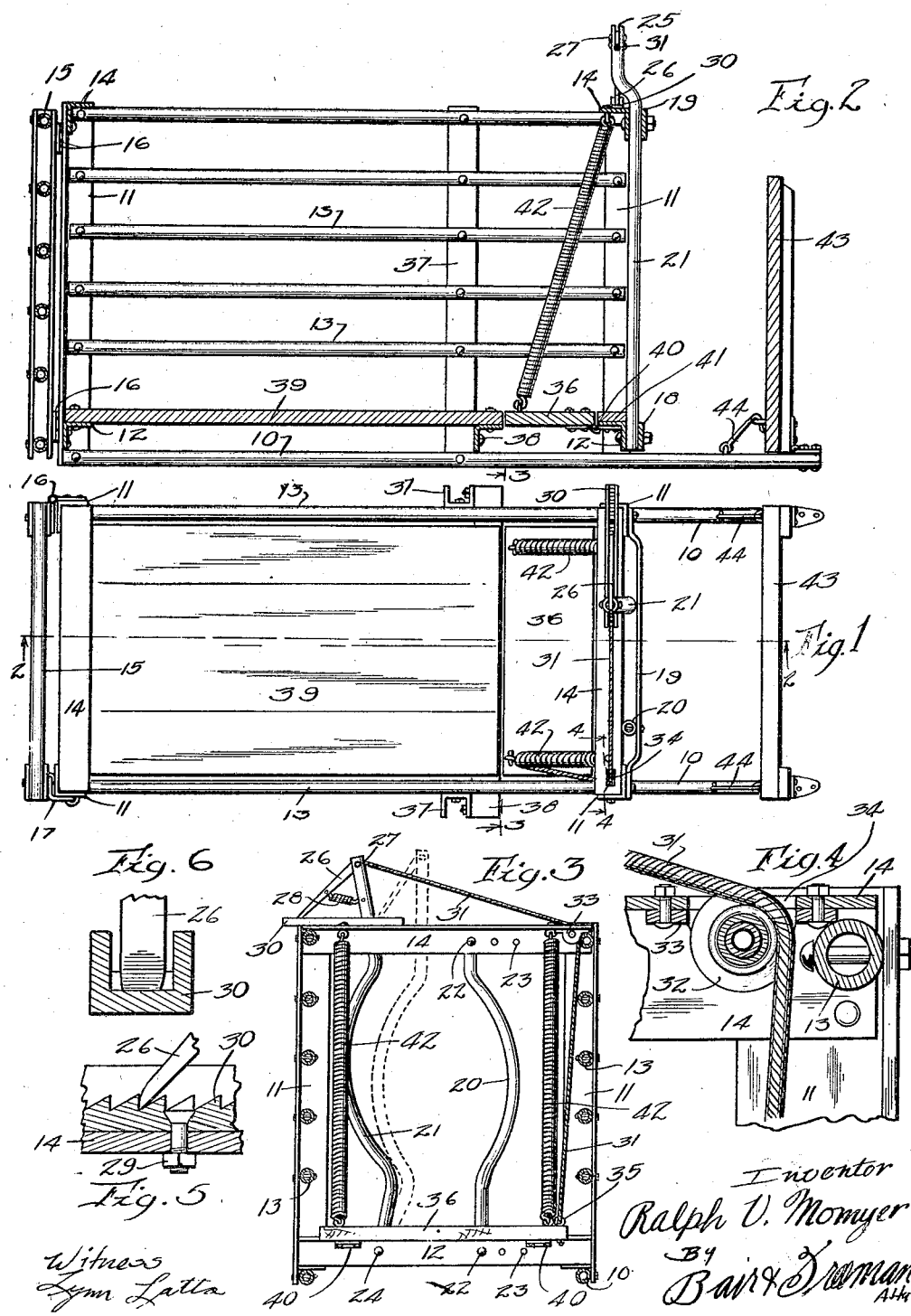

1,517,573

UNITED STATES PATENT OFFICE.

RALPH V. MOMYER, OF KNOXVILLE, IOWA.

HOG TRAP.

Application filed May 14, 1923. Serial No. 638,810.

*To all whom it may concern:*

Be it known that I, RALPH V. MOMYER, a citizen of the United States, and a resident of Knoxville, in the county of Marion and State of Iowa, have invented a certain new and useful Hog Trap, of which the following is a specification.

The object of my invention is to provide a trap of simple, durable and inexpensive construction.

More particularly, my invention relates to a trap for catching a hog and holding it for ringing purposes.

Still a further object is to provide a stanchion member at the forward end of the trap for engaging the neck of the hog, the stanchion member being operable from a swinging platform upon which the front feet of the hog may rest.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1 is a top plan view of my improved hog trap.

Figure 2 is a central, sectional view taken on line 2—2 of Figure 1.

Figure 3 is a sectional view taken on line 3—3 of Figure 1.

Figure 4 is a detail, sectional view taken on line 4—4 of Figure 1; and

Figures 5 and 6 are detail sectional views of the latch member for the stanchion.

My improved trap includes a pair of pipe members 10 which are spaced apart. Secured to the pipes 10 and extending upwardly therefrom are the uprights 11. The uprights 11 are preferably formed of angle iron material. The uprights 11 are connected together by cross pieces 12, which are also formed of angle iron material.

Secured to the uprights 11 are a number of pipes 13, which are spaced apart and form side walls for the crate. A pair of cross pieces 14 also formed of angle irons connect the upper ends of the uprights 11 together.

From the construction of the parts just described, it will be seen that a frame is formed. The pipes 10 project forwardly beyond the front uprights 11 as clearly shown in the drawings.

A swinging gate member 15 is secured to one of the back uprights 11 by means of the hinges 16. A latch member 17 is fixed to the other back upright member 11 and cooperates with a hook fixed to the gate member 15.

A pair of yoke members 18 and 19 are fixed to the front cross pieces 12 and 14. The yoke members 18 and 19 are spaced away from the cross pieces 12 and 14 for receiving the stanchion members 20 and 21 therebetween.

The stanchion member 20 is fixed between the yoke members 18 and 19 and cross pieces 12 and 14 by means of the bolts 22.

The yoke members 18 and 19 as well as the cross pieces 12 and 14 are provided with a number of openings 23, whereby the stanchion member 20 may be adjustably mounted in any of them.

The stanchion member 21 is pivoted on a bolt 24 secured to the cross piece 12 and the yoke member 18. The upper end of the stanchion member 21 is capable of sliding movement between the yoke 19 and the cross piece 14.

The upper end of the stanchion member 21 projects above the yoke 19 and is bifurcated, as at 25, for receiving the locking pawl 26. The locking pawl 26 is fixed to the stanchion member 21 by means of a rivet 27.

A coil spring 28 connects the locking pawl 26 to the stanchion member 21.

Mounted on the cross piece 14 by means of the bolts 29, is a ratchet member 30. The locking pawl 26 coacts with the ratchet member 30.

A cable 31 has one end fixed to the bifurcated portion of the stanchion member 21 and extends around a pulley 32, which is mounted in a bracket 33, which in turn is fixed to the cross piece 14.

The cross piece 14 is provided with a cut away portion 34 so that the cable 31 may extend therethrough. The cable 31 has its free end fixed, as at 35, to a treadle 36.

A pair of upright members 37 are fixed to the pipe 13. A cross piece 38 connects the lower ends of the uprights 37 together.

A supporting platform 39 is mounted upon the rear cross piece 12 and the cross piece 38.

The trap door 36 is hinged to the cross piece 12 by means of the hinges 40 and is arranged so that its upper surface is flush with the upper surface of the platform 39.

A filler block 41 is mounted upon the cross piece 12.

A pair of heavy springs 42 are connected to the trap door 36 on one end and to the forward cross piece 14 at their upper ends.

When it is desired to drive a hog into the trap the gate member 15 is opened and the stanchion member 20 is in the position shown in solid lines in Figure 3. The hog is then driven into the trap and as soon as its front feet rest upon the trap door 35, it will cause the door to move downwardly, thus pulling the cable 31 with it.

The cable in turn will draw the stanchion member 21 to the position shown in dotted lines in Figure 3 of the drawings.

The locking pawl 26 will prevent the stranchion member, after it is moved to closed position, from being accidentally pushed open.

The stanchion members are provided with bowed parts for engaging the hog's neck. Hinged to the forward ends of the two pipes 10 is a gate member 43. The gate member 43 is held in upright position by means of the latches 44.

The gate member 43 is spaced from the stanchion so as to serve as a stop and means to prevent the hog in its rush from pressing on through the stanchion.

It will be seen that I have provided a very efficient trap for catching a hog and for holding it in position so that its nose can be rung or for giving it any medical attention necessary.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. In a device of the class described, a frame having a supporting platform therein, a gate member at one end of said frame, a stanchion members at the other end of said frame, a treadle mounted in said supporting platform, springs for normally holding the treadle in raised position, and means for operatively connecting the treadle with the stanchion members for operating them, said means including a cable secured at one end of said treadle and at its other end to one of the stanchion members.

2. In a hog trap, a frame, a supporting platform, a pair of aligned, spaced cross members at the forward end of the frame at the bottom thereof, a similar pair of cross members at the forward end of the frame at the top thereof, a fixed stanchion mounted at both ends between said cross members, a movable stanchion pivoted between the lower cross members and slidably received between the upper cross members, said movable stanchion having an upwardly projecting extension, a pawl pivoted to the end of said extension, a rack fixed to one of the upper cross members and adapted to coact with the pawl for preventing movement of the movable stanchion away from the fixed stanchion, a treadle mounted in the supporting platform, springs for normally holding the treadle in raised position, and a cable for operatively connecting the treadle with the movable stanchion, for moving it toward the fixed stanchion when the treadle is depressed.

3. In a hog trap, a frame, a pair of aligned, spaced cross members at the forward end of the frame at the top thereof, a fixed stanchion fixed at its upper end to the cross members and at its lower end to the frame, a movable stanchion pivoted at its lower end to the frame and having its upper end slidably received between the cross members, said fixed stanchion being capable of lateral adjustment, said movable stanchion having an upwardly projecting extension, a pawl pivoted to the end of said extension, a rack fixed to one of the upper cross members and adapted to coact with the pawl for preventing movement of the movable stanchion away from the fixed stanchion, a treadle at the forward end of the frame, springs for normally holding the treadle in raised position, said treadle being operatively connected to said movable stanchion whereby movement of the treadle will cause the movable stanchion to operate as and for the purposes stated.

Des Moines, Iowa, May 3, 1923.

RALPH V. MOMYER.